United States Patent [19]
Rieder et al.

[11] Patent Number: 4,996,778
[45] Date of Patent: Mar. 5, 1991

[54] INCREMENTAL MEASURING SYSTEM

[75] Inventors: Heinz Rieder, Oberndorf; Max Schwaiger, Ostermiething, both of Austria

[73] Assignee: RSF-Electronik Gesellschaft m.b.H., Tarsdorf, Austria

[21] Appl. No.: 465,480

[22] Filed: Jan. 16, 1990

[30] Foreign Application Priority Data

Feb. 7, 1989 [AT] Austria ................................. 246/89

[51] Int. Cl.$^5$ ............................................. G01B 11/02
[52] U.S. Cl. ............................................ 33/707; 33/706; 250/237 G
[58] Field of Search ............... 33/703, 705, 708, 706, 33/DIG. 3, 700, 701, 1 L, 707; 250/578, 237 G; 356/374, 375, 373

[56] References Cited

U.S. PATENT DOCUMENTS 4,363,964 12/1982 Schmitt .......................... 250/237 G
4,459,751 6/1984 Nelle ................................... 33/708

Primary Examiner—Allan N. Shoap
Assistant Examiner—Alvin Wirthlin
Attorney, Agent, or Firm—Kurt Kelman

[57] ABSTRACT

An incremental measuring system comprises a scale member provided in one track with a measuring scale, and an optoelectronic scanning unit for generating measured-valve signals in response to a scanning of the scale. The scale member is provided in an additional track with two or more reference marks and the scanning unit is operable to scan the reference marks and to generate reference signals in response to the scanning of the additional track at one or more selectable reference points provided with such reference marks. The scale member and the scanning unit are encapsulated in an enclosure, which is formed with a slot, which is covered by a seal. An actuating member for the scanning unit extends through the slot past the seal. Covers for covering at least part of the reference marks are provided and are adapted to be inserted and/or removed into and from the enclosure or shifted along the tracks by a positioning member, which extend through apertures formed in the enclosure. The covers are used to select the reference points which are entirely exposed for being scanned by the scanning unit. The apertures are closed and sealed or are adapted to be closed and sealed.

15 Claims, 1 Drawing Sheet

U.S. Patent     Mar. 5, 1991     Sheet 1 of 1     4,996,778
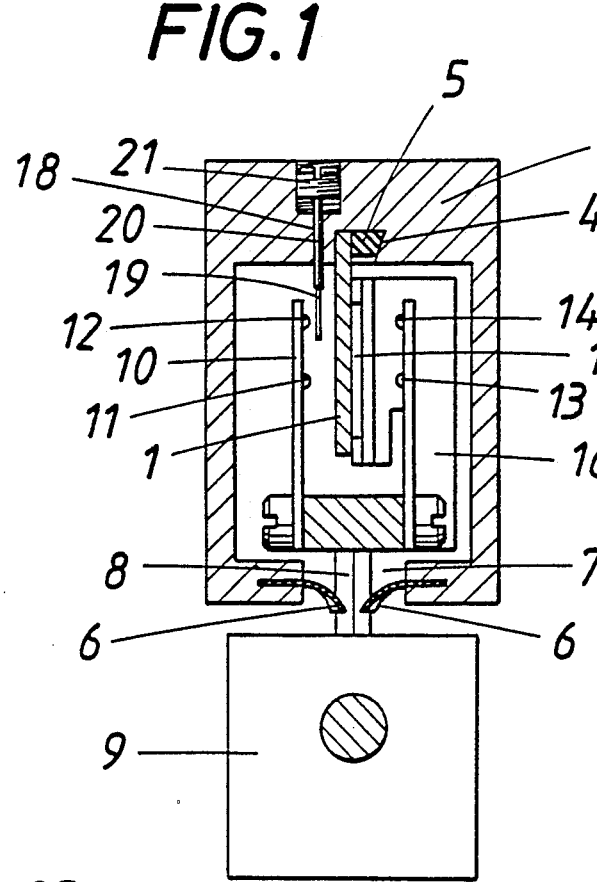
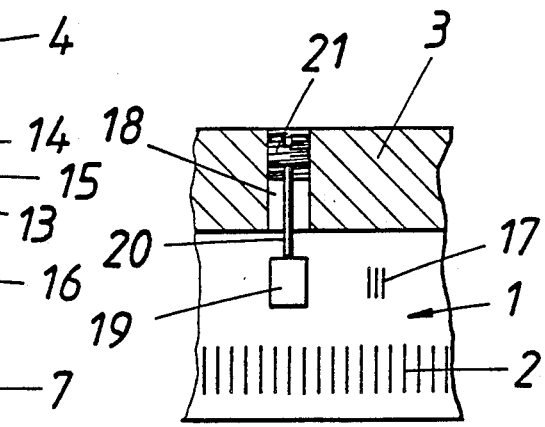
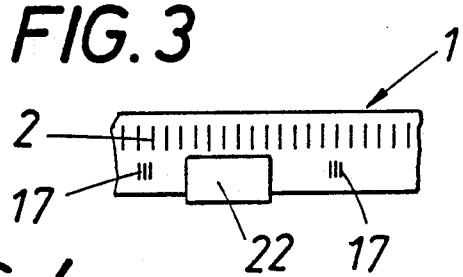
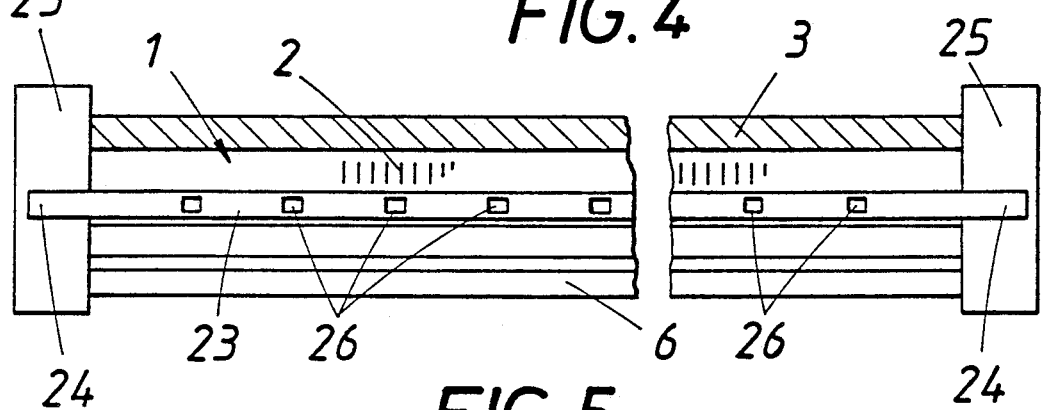
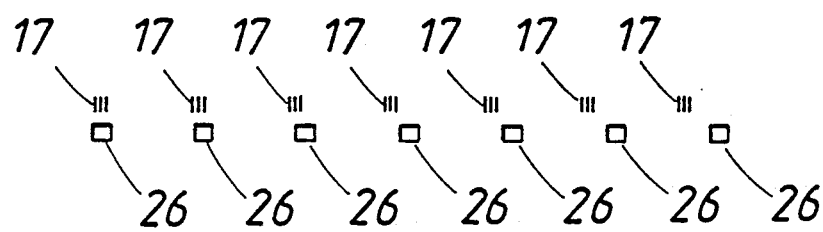

INCREMENTAL MEASURING SYSTEM

BACKGROUND OF THE INVENTION

1. Field of the Invention

This invention relates to an incremental measuring system, particularly to a system for measuring lengths, comprising a scale member, which is provided with a scale, which is adapted to be scanned by an optoelectronic scanning unit for generating measured-value signals and is provided in at least one additional scannable track with two or more reference marks for a generation of reference signals at one or more selectable reference points, wherein the scale member and the scanning unit are encapsulated in an enclosure, which is formed with a slot, which is covered by sealing means and through which a member for actuating the scanning unit extends past said sealing means.

2. Description of the Prior Art

Measuring system of that kind are mainly used for a measurement of lengths with high accuracy and in a modified form as an angular position indicator for a measurement of angles with high accuracy. The scale consists in most cases of incremental elements consisting each of a bright field and a dark field with a pitch which may be as small as 0.004 mm. The scanning of the scale results in the generation of basically sinusoidal analog measured-value signals and a complete waveform of said signals is generated as a result of the scanning of a complete increment of the scale. In most cases at least two measured-value signals are produced, which may be displaced in phase, e.g., by 90°. The measured-value signals are converted to countable signals and/or are fed to computers for interpolating computations so that measurements or indications having an accuracy of 0.0001 mm can be achieved. The direction of the scanning movement and the counting sense are determined in dependence on the phase-displaced signal trains. The countable digital signals may be used as control signals for use in control systems for machines or robots. To establish a definite relation between the analogue measured-value signals and that portion of the scale which is being scanned, it is necessary to set the evaluating means and the counting means to certain values, such as zero, when the scale is being scanned at preselectable points. Such setting operations must be performed before the measuring system is put into operation for the first time and in most cases at the beginning of each working day. For that purpose, reference signals are employed, which have been generated in response to the scanning of reference marks. The reference marks are provided on the scale member together with the measuring scale, in most cases by photolithography. Care must be taken that the proper phase relations are obtained between the reference signals and the analog measuredvalue signals which are generated and between the edges of the reference pulses and the digital countable signals which are derived from said measured-value signals. It may often be necessary to provide reference signals in response to the scanning at different locations on scale members which are equal in other respects. It would not be economical to manufacture each scale member with the specific reference marks which are required thereon. For this reason a practice which is often adopted resides in that a large number of reference marks having a uniform or non-uniform spacing are provided on the scale member as it is manufactured and one or more reference marks which is or are required are selected from the reference marks which have originally been provided. A removal of reference marks or a sticking of a covering on reference marks can usually be effected only in the plant in which the scale members are manufactured and in any case cannot be effected in most cases by the user of the encapsulated measuring system because such user would have to remove the scale member and to scratch off or cover certain reference marks and such work might often result in damage to the scale member or the scanning unit or in an ingress of foreign matter into the enclosure or in a change of the adjustment of the scanning unit. It must be borne in mind that the performance of measurements with high accuracy often requires the use of correction tables for the measuring system and such tables are prepared by the manufacturer of the measuring system as a result of a comparison of the results of the measurements performed by the measuring system with the results of measurements performed by a higher-ranking measuring system, such as a laser interferometer. Such tables may be stored in correcting memories of the evaluating unit. It may also be necessary to operate the measuring system in an inert gas atmosphere or under a superatmospheric pressure. In view of such difficulties, other methods have been adopted for a selection of reference marks used to generate reference signals. In one method which may be used, individual reference marks are identified by additional means, such as additional indentifying features, so that a reference mark which is being scanned can be identified and a reference signal will be transmitted only when it has been generated at a selected reference mark. Selecting systems which may be employed may consist of mechanical on-off switches for enabling an activating circuit only in response to scanning of preselected reference marks, or magnets which serve to operate reed relays may be provided on the scale member at preselectable locations. But the mounting of such magnets requires an ingress into the encapsulated measuring system. It is also known to provide the reference marks in a plurality of reference tracks, to provide a scanning unit in association with each reference track and to select a reference mark in that the scanning unit which is associated with the respective reference track is selectively enabled for a generation of reference signals. In that case too a change of the selection of specified reference marks and the adjustment of the selection requires considerable work and time and such work can be performed only by a skilled person and the means required for that purpose add to the costs of the system. When it is contemplated to erase reference marks which are not required, as stated hereinbefore, reference marks may be provided in two sets with a uniform spacing and duplicate scanning units may be arranged in an antiparallel connection so that their signals will offset each other unless an existing reference mark and a region in which a reference mark has been erased are scanned at the same time. In the previous practice an ingress into the measuring system has been required for an erasing of reference marks. Besides, reference marks which have been released cannot be reinstituted in practice. For this reason an initial selection of reference marks to be employed cannot subsequently be altered.

SUMMARY OF THE INVENTION

It is an object of the invention to provide a measuring system which is of the kind described first hereinbefore and which permits a subsequent selection of reference marks to be effected with very simple means and without risk of damage to the scale member and the scanning unit and permits such subsequent selection to be effected also by the user of the measuring system.

That object is accomplished in that the enclosure contains covering means which can be moved to and/or from a covering position relative to at least part of said reference marks and are accessible for such movements through aperture means formed in the enclosure or through said slot, said aperture means or slot are or is adapted to be closed or sealed and said covering means are adapted to be inserted into and removed from said enclosure through said aperture means or said slot or can be shifted along said scale member to and/or from said covering position.

Whereas the concept in accordance with the invention may seem extremely simple, it is superior to all known teachings also owing to its simplicity. In a preferred practice of the invention all reference marks are initially covered and only that reference mark which is required or those reference marks which are required is or are exposed by the user of the measuring system. Means for removing or shifting coverings can be provided in arrangements which are simpler than means which permit coverings to be applied and to be removed.

In a simple embodiment the coverings consist of covering clips, which are mounted on the scale member at the edge face which faces the slot and are provided with spring legs, which engage the scale member on both sides. Such covering clips can be mounted or removed from or shifted along the scale member by a holding implement, which is inserted through the slot. In a modification of that embodiment the actuating member, which in most cases is swordlike, is provided with detaching implements, which are adapted to be inserted and extracted through the slot and are operable from the outside to detach coverings which have initially been mounted on the scale member. In such embodiments the clips may resiliently engage the scale member in guiding grooves extending along the scale member on both sides thereof and the implements may be used to shift the clips to or out of a position for covering a given reference mark in case of need.

In a different embodiment the enclosure is provided with apertures, which register with respective reference marks and can be sealed and permit an insertion of implements for applying coverings to the scale member, for removing coverings from the scale member or for shifting coverings along the scale member.

The manipulation of the coverings will be facilitated in a different embodiment, in which a covering member consists of a continuous strip or plate, which extends over the reference track or tracks and is manually movable along the scale member by means of external control elements and is formed with at least one window, which is adjustable to register with a reference mark. The end portions of the strip may extend through sealed apertures in the enclosure to the external controls and may be fixed in position or removed when the window has been adjusted to register with a reference mark.

In measuring systems which are required to permit a selection of reference marks in various length portions of the scale member, it is desired to avoid a need to move the covering strip or plate over large distances. This can be accomplished in that the covering is formed with windows, which have along the scale member a spacing which differs from the spacing of the reference marks along the scale member and said covering is movable to a position in which said one window registers with only one of the reference marks. The spacing of the reference marks may be uniform and the windows may have a uniform spacing, which differs from the spacing of the reference marks in a vernier arrangement. Similarly, an angular position indicator may be provided with reference marks on a circular track and the covering member may have the shape of a circular ring, which may be constituted by an annular plate, and may be formed with windows.

Only some desirable embodiments of the basic concept of the invention have been outlined hereinbefore but the invention is not restricted thereto. All reference marks may be provided with coverings which are resiliently biased to a position in which they expose the associated reference marks and are held in the covering positions by screws or pins, which are accessible from the outside so that a release will be effected when the screws or pins have slightly been adjusted.

BRIEF DESCRIPTION OF THE PREFERRED EMBODIMENTS

FIG. 1 is a diagrammatic transverse sectional view showing a scale member and an enclosure of an incremental measuring system for an optoelectronic scanning operation.

FIG. 2 is a fragmentary longitudinal sectional view showing as a detail of FIG. 1 a portion of the enclosure in which a covering is to be applied.

FIG. 3 shows a modified design with a scale member shown in elevation.

FIG. 4 is a fragmentary longitudinal sectional view showing a measuring system without the scanning unit.

FIG. 5 shows reference marks and windows of covering means arranged one over the other for a detailed explanation of FIG. 4.

DETAILED DESCRIPTION OF THE PREFERRED EMBODIMENTS

Illustrative embodiments of the invention will now be described with reference to the drawing in order to facilitate the understanding of the invention and to explain further details and advantages thereof.

The embodiment shown in FIGS. 1 and 2 comprises a scale member 1, which consists, e.g., of glass and a first track provided thereon with an incremental scale represented in FIG. 2 at 2 by a series of graduations. The scale member 1 is accommodated in a tubular enclosure 3, which has a relative thick top wall that constitutes a carrier. One edge portion of the scale member 1 is held by a resilient retaining member 5 in a groove 4 formed in the inside surface of the top wall of the enclosure 3. The bottom wall of the enclosure 3 is formed with a slot 7, which is provided with sealing lips 6. Between the lips 6, a swordlike actuating member 8 extends through the slot 7 into the enclosure 3 and is secured to a member 9, which is movable along the scale 1 and the enclosure 3 and may constitute a carriage of a machine tool.

The actuating member 8 carries a bracket 10, which carries light sources 11, 12 and associated optoelectronic receivers 13, 14. The light sources 11, are operated to illuminate a plurality of photoelectric receivers 13, e.g., four of such receivers, through scanning gratings, which are offset from each other by fractional parts of a scale increment and are provided in a slider 15. By means of the actuating member 8 the slider 15 is movable along the scale. The slider 15, the bracket 10 and a holder 16 for the slider 15 constitute a scanning unit. The photoelectric receivers 13 produce analog measured-value signals. In most cases, two measured-value signals, which are displaced 90° in phase, are delivered to an evaluating stage.

The light source 12 serves to illuminate reference marks 17, which are provided on the scale member 1 in an additional track. In association with the reference marks 17 the slider 15 is provided with an additional scanning grating, through which the photoelectric receiver 14 is illuminated.

To permit a selection of certain reference marks 17, means are provided for selectively covering individual reference marks. In the embodiment shown in FIGS. 1 and 2 the enclosure 3 is provided for that purpose with apertures 18, which have a slotlike bottom portion and a top portion consisting of a tapped bore. Through said apertures 18, covering plates 19 may be introduced to cover respective ones of the reference marks 17 (in the embodiment shown in FIG. 1 on that side of the scale member 1 which faces the light source 12) or covering plates which have been introduced can be removed from the enclosure 3. When such a plate 19, which is mounted on a positioning means in the form of an elastic wire 20 and held in position by a screw 21, has been removed, the aperture 18 is closed by a short screw that is provided with a sealing washer.

In the embodiment shown in FIG. 3, reference marks 17 are provided on the scale member 1 near its bottom edge. One reference mark is covered by a covering element 22, which consists of a clip, which resiliently embraces the bottom edge portion of the scale member. The clip 22 is adapted to be inserted and removed by means of a flat holding implement, which can be inserted through the slot 7 between the sealing lips 6.

In the embodiment shown in FIGS. 4 and 5 the reference marks are provided with a uniform spacing on the lower portion of the scale member 1 in a continuous reference track. The reference track is covered throughout its length by a covering strip 23, which has end portions 24, which extend out of the enclosure 3 and terminate in end closures 25. In one embodiment the end closures 25 may be used as mountings for the measuring system. In a preferred embodiment the end closures 25 are formed with interior chambers, which contain means for winding up the covering strip 23. Such winding means may be operable from the outside and may consist, e.g., of winding hubs. The covering strip may extend out of the enclosure 3 between sealing lips. As stated, the reference marks have a uniform spacing. The strip 23 is provided with windows 26, which are associated with respective reference marks 17 and have a uniform longitudinal spacing, which differs from the spacing of the reference marks 17, as is apparent from FIG. 5. This arrangement is similar to a vernier so that in any position of the strip 23 only one reference mark 17 will be entirely exposed by one of the windows whereas all other reference marks 17 will entirely or partly be covered. In the embodiment shown by way of example the first reference mark from the left is entirely exposed by the associated window 26 of the strip 23. The two following reference marks 17 on the right and any adjacent reference mark on the left are covered in part by the associated windows 26 and the scanning of said partly covered reference marks will result in the receiver 14 in a generation of signals which are distorted relative to the reference signals produced in response to the scanning of the reference mark 17 which is entirely exposed. Said distorted signals cannot be used for the generation of a reference pulse but may be used to enable the evaluating circuit for the generation of a reference pulse in response to the scanning of an entirely exposed reference mark.

We claim:

1. In an incremental measuring system comprising
   a scale member, comprising first track with a scale and at least one additional track with at least two spaced apart reference marks, extending adjacent to said first track,
   an optoelectronic scanning unit, which is mounted to be movable relative to said scale member along said tracks and is operable to scan said scale for a generation of measured-value signals and to scan said additional track so as to generate reference signals in response to the scanning of said reference marks at at least one selectable reference point on said at least one additional track,
   an enclosure containing said scale member and said scanning unit and formed with a slot, which extends along said tracks and is covered by sealing means, and
   an actuating member, which is connected to said scanning unit and extends past said sealing means through said slot and is movable along said slot,
   the improvement residing in that
   said enclosure contains covering means, which are movable relative to said scale member to and from at least one covering position, in which said covering means cover at least one of said reference marks sufficiently to inhibit a generation of at least one of said reference signals by said scanning unit in response to the scanning of said at least one additional track adjacent to said at least one reference mark which is covered by said covering means,
   said enclosure is formed with aperture means through which said covering means are accessible from the outside for a movement relative to said scale member to and away from said at least one covering position and
   closing means are provided for closing said aperture means.

2. The improvement set forth in claim 1, wherein said aperture means comprise said slot.

3. The improvement set forth in claim 2, wherein said closing means comprise said sealing means.

4. The improvement set forth in claim 1, wherein said covering means are initially in said covering position.

5. The improvement set forth in claim 1, wherein said covering means are movable in the direction of said tracks to and from said at least one covering position.

6. The improvement set forth in claim 1, wherein said covering means are movable transversely to the direction of said tracks to and from said at least one covering position through said aperture means.

7. The improvement set forth in claim 1, wherein said covering means are movable to and from said at least one covering position by positioning means extending through said aperture means.

8. The improvement set forth in claim 1, wherein said closing means are removable from said aperture means.

9. The improvement set forth in claim 1, wherein said scale member has a side face formed with said scale and an edge face facing said slot, said at least one additional track is provided on said side face between said first track and said edge face, said covering means comprise covering clips, which extend across said edge face and have resilient legs engaging said scale member on opposite sides thereof, one of said resilient legs extends across said at least one additional track, and each of said covering clips is adapted to be moved along said at least one additional track by a holding implement extending through said slot.

10. The improvement set forth in claim 1, wherein said covering means are permanently mounted in said enclosure and cover said at least one additional track and are formed with at least one window, which registers with said at least one additional track, said covering means are movable in the direction of said tracks to and from at least one exposing position, in which said at least one window sufficiently exposes at least one of said reference marks to said scanning unit for permitting a generation of at least one of said reference signals by said scanning unit in response to the scanning of said at least one additional track adjacent to said at least one reference mark which is exposed by said window, and positioning means, which are accessible from the outside of said exclosure, are operatively connected to said covering means and operable to move said covering means to and from said at least one exposing position.

11. The improvement set forth in claim 10, wherein said covering means comprise a strip formed with said at least one window.

12. The improvement set forth in claim 10, wherein said covering means are formed with a plurality of windows, which register with said at least one additional track and have in the direction of said tracks a spacing which differs from the spacing of said reference marks, and said covering means are movable to at least one of said exposing positions, in each of which at least one of said reference marks is fully exposed by one of said windows and at least one of said reference marks is at least partly covered by said covering means.

13. The improvement set forth in claim 12, wherein at least three of said reference marks having a uniform spacing along said tracks are provided in said at least one additional track, said windows have in the direction of said tracks a uniform spacing, which differs from said spacing of said at least three reference marks as in a vernier, and said covering means are movable to a plurality of exposing positions, in which different ones of said at least three reference marks, one at a time, are fully exposed by respective ones of said windows and at least one of said at least three reference marks is at least partly covered by said covering means.

14. The improvement set forth in claim 1 as applied to a system for measuring lengths.

15. The improvement set forth in claim 1, wherein said aperture means comprise a plurality of apertures, which register with respective ones of said reference marks, said closing means are operable to open each of said apertures, said covering means comprise covering elements, which are associated with respective ones of said reference marks and with respective ones of said apertures and are initially in said covering position, and each of said covering elements is movable transversely to said tracks from said covering position out of said enclosure through the associated one of said apertures when it is open by positioning means extending through said one aperture.

* * * * *